W. PARFREY.
SHOCK ABSORBER.
APPLICATION FILED JULY 23, 1920.
1,433,296.
Patented Oct. 24, 1922.
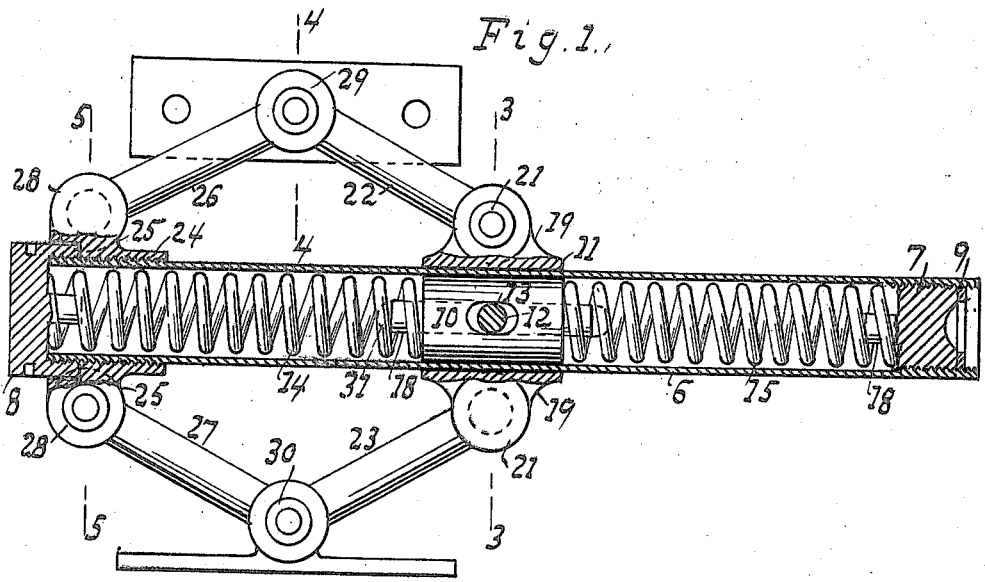
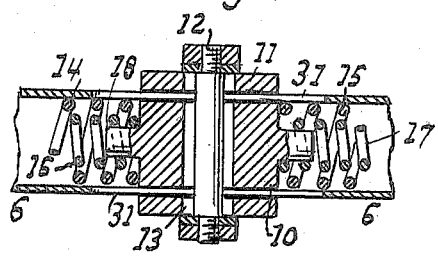
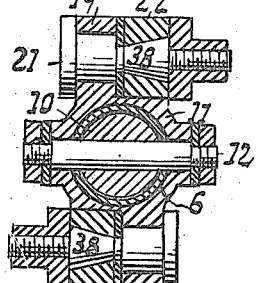
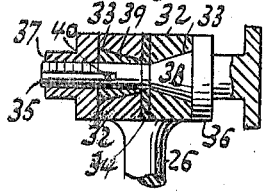
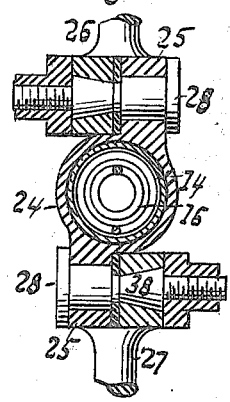
WITNESS:
William Miller
INVENTOR.
William Parfrey
BY Hauff & Barland
ATTORNEYS Patented Oct. 24, 1922.

1,433,296

UNITED STATES PATENT OFFICE.

WILLIAM PARFREY, OF NEW YORK, N. Y.

SHOCK ABSORBER.

Application filed July 23, 1920. Serial No. 398,432.

*To all whom it may concern:*

Be it known that I, WILLIAM PARFREY, a subject of the King of Great Britain, residing at New York, in the county of New York and State of New York, have invented new and useful Improvements in Shock Absorbers, of which the following is a specification.

This invention relates to a compensating device for absorbing the shocks and vibrations given to the body and running gear of a vehicle while it is propelled along the ground.

The invention is designed to provide a spring controlled plunger arranged in a tube, and toggle levers connected to the plunger and tube for easing up the jars caused by striking an obstruction transmitted to the running gear and body or chassis of the vehicle.

An object of the invention is to provide frictional connections for the toggle joints made to serve as auxiliaries to the spring controlled plunger and resist any sudden jars.

The invention resides more particularly in the novel combinations hereinafter described and claimed, reference being made to the accompanying drawing, in which:

Fig. 1 represents a sectional side elevation of a device embodying this invention;

Fig. 2 is a horizontal longitudinal detail section of the plunger;

Fig. 3 is a vertical section taken along the line 3—3 of Fig. 1;

Fig. 4 is a vertical section taken along the line 4—4 of Fig. 1; and

Fig. 5 is a similar section taken along the line 5—5 of Fig. 1.

In the drawing the numeral 6 designates a tube one end of which is closed by a threaded plug 7 while the other end is closed by a plug cap 8 screwed onto the tube. A lock washer 9 co-acting with the plug 7 prevents the plug from jarring loose. In the tube is arranged a plunger 10 cylindrical transversely and fitted loosely in the tube. The plunger is connected to a sleeve member 11 by means of a bolt 12, as indicated in Fig. 3, passing through a slot 13 formed in the sleeve and plunger.

A pair of coiled springs 14 and 15 are arranged between the ends of the plunger and the plugs. These springs surround coiled springs 16 and 17 of smaller radius centered on studs 18 formed on the ends of the plunger and plugs.

The springs 16 and 17 telescope into the larger coils 14 and 15 and the convolutions of each pair are right and left handed respectively to eliminate any danger of the springs from getting jammed. These compound springs on each side evenly balance the plunger when in its normal position as shown in Fig. 1. A lubricant such as grease or vaseline can be placed in the tube to ease up the movement of the springs and plunger.

The sleeve has a pair of flanges 19 projecting upward and downward provided with eyes, and links 22 and 23 having recessed ends with eyes, are connected by means of pins 21 passing through the eyes of the links and the flanges to the sleeve. A thimble 24 having an interior thread is screwed onto the end of the tube. The thimble is equipped with a pair of flanges 25 having eyes and links 26 and 27 with recessed flanged ends having eyes are connected by means of pins 28 co-acting with the eyes of the flanges to the thimble. The other ends of the upper links 22 and 26 are fulcrumed at 29 to the body or chassis of the vehicle and the lower links have their ends correspondingly fulcrumed at 30 to the spring or running gear as is well known. In the foregoing arrangement it is preferred that each pin should have a conical member 38 fitting in a corresponding bore or eye in a flange to obviate loosening of the joints.

Longitudinal slots 31 in the tube permit the plunger and sleeve to slide in either direction, and in connection with the bolt 12 prevent the sleeve and plunger from turning on its axis. The plug 7 can be adjusted to compress or expand the springs on either end of the plunger.

As indicated in Fig. 4, the fulcrumed joint 29 or 30 includes links having flanged recessed ends 32 provided with conical bores or eyes 33 and a fibre packing ring or gasket 34 is arranged between the faces of the flanges. A pin 35 having a head 36 and a threaded end to engage a nut 37 is adapted to connect the two links. A portion of the pin adjacent to the head is conical as shown at 38 to fit into the conical bore of one of the flanges. On the stem of the pin opposite the conical member is arranged a truncated conical sleeve 39 secured to the stem by a key 40 engaging a longitudinal key way in the stem. The key prevents the sleeve from turning on its axis, but the sleeve has longitudinal play room to more readily fit it in its bore. The conical members have a tendency to force the faces of the flanges against the fibre packing ring thus making a tight joint. By screwing up the nut the faces of the flanges in conjunction with the force exerted by the conical members will frictionally jam against both sides of the packing ring so as to absorb the vibrations caused by the vehicle traveling over uneven ground.

When the vehicle is in motion the upward bound of the axle or downward movement of the chassis is transmitted by the fractional fulcrum 30 to the sleeve 11, and the plunger will slide toward the plug 7 compressing the spring 15 and the pivoted connections 28 will move outward. When the axle and chassis separate the sleeve and plunger slide toward the cap 8 compressing the spring 14 to neutralize the rebound. By having the springs arranged on both ends of the plunger the device will relieve any sudden up or down shock given to the vehicle.

I claim.

1. A shock absorber comprising a tubular member having closed ends, a plunger slidingly arranged between the ends in the member, coiled springs coacting with both ends of the plunger, pairs of toggle levers the joints thereof being respectively connected to the running gear and body of a vehicle, said toggles having having their ends pivoted to the plunger and one end of the tubular member.

2. A shock absorber comprising a tubular member having an adjustable plug in one end and a cap on the other end, a plunger slidingly arranged between the ends in the member, compound coiled springs coacting with both ends of the plunger, pairs of toggle levers the joints thereof being respectively connected to the running gear and body of a vehicle, said toggles having their ends pivoted to the plunger and the cap.

3. A shock absorber comprising a tubular member having plugged ends, a plunger arranged in the member, a sleeve connected to the plunger, a pair of telescopic coiled springs mounted between each plug and each end of the plunger, means for adjusting one of the plugs to regulate the springs, and toggle levers connected to the sleeve and the tubular member.

4. A shock absorber comprising a tubular member having plugged ends, a plunger arranged in the member, a sleeve connected to the plunger, a pair of telescopic coiled springs mounted between each plug and each end of the plunger, means for adjusting one of the plugs to regulate the springs, toggle levers connected to the sleeve and the tubular member, and means for connecting the toggle levers to the running gear and body of a vehicle.

In testimony whereof I have hereunto set my hand in the presence of two subscribing witnesses.

WILLIAM PARFREY.

Witnesses:
  WM. E. WARLAND,
  WILLIAM MILLER.